United States Patent Office 3,561,997
Patented Feb. 9, 1971

3,561,997
PROCESS FOR METAL COATING A PLASTIC LAYER
John Arne Wallinder, Surrey, England, assignor to Perstorp AB, Perstorp, Sweden, a Swedish joint-stock company
No Drawing. Filed Apr. 25, 1968, Ser. No. 724,284
Claims priority, application Great Britain, May 2, 1967, 20,293/67
Int. Cl. B44c 5/02, 1/22
U.S. Cl. 117—68      4 Claims

ABSTRACT OF THE DISCLOSURE

Method of producing a laminated material containing at least one thin layer of metal, by applying a layer of plastics material containing in a distributed condition 10–40% by weight of a finely divided substance having a particle size between 0.0005–0.01 mm. to at least one side of a foundation sheet, removing said finely divided substance from the free surface of the plastics layer by chemical action, thus obtaining a surface pitted with cavities, and metallizing a thin layer of metal upon said pitted surface.

IMPROVEMENTS RELATING TO LAMINATED SHEET MATERIAL

This invention concerns improvements relating to laminated sheet-material, board and the like.

According to the invention, such a laminated material is produced by applying to one or both sides of a foundation or reinforcement sheet a layer of a plastics material containing a finely divided substance in a distributed condition and then removing the said substance, at least from the free surface of the layer, by chemical action. By this means, it is possible to produce on the layer or each layer of plastics material a pitted surface affording a film anchorage for the application of a further layer, particularly a plated metal layer. The invention is especially concerned with the production in this manner of a laminated material comprising such a metal layer or layers.

Suitably the foundation or reinforcement sheet is made of a fibrous material impregnated with a plastics material, for example paper impregnated with an epoxy or phenolic resin. Alternatively the sheet may be made of plastics-bonded glass fibre or fabric. Finally, in some cases, the sheet may be made of metal, particularly aluminium, glass or other homogeneous material. The sheet may itself be of laminated material.

The applied layer or layers may suitably be composed or an epoxy-plastics material.

The finely divided substance may be powdered chalk of a particle size between ½ and 10 microns, the amount incorporated in the plastics material of the layer being between 10 and 40% by weight and preferably between 25 and 35%. However, other finely divided filling substances may be used provided that they can be removed from at least the free surface of the layer by a chemical reagent which will not appreciably attack the plastics material. In the case of powdered chalk, an appropriate reagent is sulphuric or hydrochloric acid. Examples of other suitable finely divided substances are slate powder and soluble salts such as NaHCO$_3$ and Na$_2$SO$_4$.

The layer containing the finely divided particles may be applied by brushing, spraying or the like. The thickness of the layer is preferably 25–50 microns. Another way of applying the layer is to impregnate a fibrous sheet with the resin containing the particles and make the sheet adherent with the foundation after drying by means of heat and pressure.

After treatment with the reagent to etch out the surface inclusions of the finely divided substance, the surface is found to be finely pitted, some at least of the pittings presenting an undercut form in cross section. Such a pitted surface provides an excellent means for physically locking to the laminated material a further required layer. This is particularly advantageous for affording a firm anchorage for a thin layer of metal to be plated or metallized upon the surface or surfaces of the laminated material, for example for the purpose of producing a condenser in which the laminated material serves as the dielectric and thin layers of metal as the plates, or for producing "printed" circuit boards.

One example illustrating how such a laminate may be prepared will now be more fully described.

An otherwise completed foundation in the form of a sheet of fibrous material, for example paper, impregnated with an epoxy resin is coated with a layer of an epoxy or phenolic resin, for instance Ciba MY 750 with HY 906, containing 30% by weight of finely divided chalk of a particle size within the range of ½ to 10 microns. The layer is then surface-treated by being ground, polished, sand-blasted or chemically etched to ensure the uncovering of particles at the surface. Finally, the surface particles are dissolved out by the application to the surface of dilute hydrochloric acid, leaving the surface pitted with cavities well adapted for affording a firm anchorage for a metal layer to be plated or metallized thereon. For this purpose, the coated sheet may be immersed in the acid in the presence of ultrasonic vibration.

Known methods of plating or metallizing may be used. However, the application of the plating metal may be assisted by treating the surface with an aqueous solution of a catalytic salt in the presence of ultrasonic vibration before chemically plating the said surface with the metal. Excitation of the plating bath by ultrasonic vibration may also be employed.

For instance, in the case of plating with copper or nickel, the coated sheet may be immersed firstly in a solution of stannous chloride, secondly in a solution of palladium chloride and finally in the plating solution of the salts of copper or nickel respectively. Ultrasonic vibration is preferably applied at each of these three stages.

If the foundation or reinforcement material is a sheet of metal, especially aluminium, the above-described procedures may again be employed. Preferably, however, the surface or surfaces of the metal are first roughened by, say, vapour or sand-blasting or are anodized. In the case of anodizing of aluminium, a surface layer of jagged crystals of aluminium oxide is produced, which assists in anchoring the applied layer of epoxy or other plastics material. For some purposes, moreover, it is advantageous that the layer of aluminium oxide is thermally conductive although not electrically conductive.

What I claim is:

1. A method for producing a laminated material having at least one thin layer of metal, which comprises applying to a foundation sheet a layer of plastic material containing in a distributed condition from about 10 to 40% by weight of a finely divided substance having a particle size between about 0.0005–0.01 mm., removing said finely divided substance from the free surface of the plastic layer by chemical action thus obtaining a surface pitted with cavities, and metallizing a thin layer of metal upon said pitted surface.

2. A method according to claim 1, wherein the layer of plastic material containing the finely divided substance in distributed condition is applied to both sides of a foundation sheet.

3. A method according to claim 1, wherein the foundation sheet is fabricated from a material selected from the group consisting of metal, glass, and plastic impregnated fibrous material.

4. A method according to claim 3, wherein said foundation sheet is aluminium.

References Cited

UNITED STATES PATENTS 2,663,663   12/1953   Weltman et al. _____ 161—116

JACOB H. STEINBERG, Primary Examiner

U.S. Cl. X.R.

117—71; 156—3; 161—115; 204—30